United States Patent
Reichmann et al.

(10) Patent No.: US 9,604,518 B2
(45) Date of Patent: Mar. 28, 2017

(54) SUSPENSION STRUT FOR A VEHICLE

(71) Applicant: THYSSENKRUPP BILSTEIN GMBH, Ennepetal (DE)

(72) Inventors: Olaf Reichmann, Bochum (DE); Steffen Werner, Breckerfeld (DE); Georg Meinert, Iserlohn (DE); Mirco Adam, Castrop-Rauxel (DE)

(73) Assignee: Thyssenkrupp Bilstein GmbH, Ennepetal (DE)

( * ) Notice: Subject to any disclaimer, the term of this patent is extended or adjusted under 35 U.S.C. 154(b) by 11 days.

(21) Appl. No.: 14/371,861

(22) PCT Filed: Jan. 7, 2013

(86) PCT No.: PCT/EP2013/050148
§ 371 (c)(1),
(2) Date: Jul. 11, 2014

(87) PCT Pub. No.: WO2013/104579
PCT Pub. Date: Jul. 18, 2013

(65) Prior Publication Data
US 2015/0014907 A1    Jan. 15, 2015

(30) Foreign Application Priority Data
Jan. 11, 2012    (DE) .................. 10 2012 000 349

(51) Int. Cl.
*B60G 15/00* (2006.01)
*B60G 15/06* (2006.01)
(Continued)

(52) U.S. Cl.
CPC .............. *B60G 15/00* (2013.01); *B60G 11/62* (2013.01); *B60G 15/06* (2013.01); *B60G 15/12* (2013.01);
(Continued)

(58) Field of Classification Search
CPC ........ B60G 15/00; B60G 15/06; B60G 15/12; B60G 15/14; B60G 15/062; B60G 15/068;
(Continued)

(56) References Cited

U.S. PATENT DOCUMENTS 4,796,870 A *  1/1989  Hoffman ............... B60G 15/14
                                                                267/35
4,817,928 A *  4/1989  Paton ................... B60G 13/006
                                                               267/219

(Continued)

FOREIGN PATENT DOCUMENTS

DE          3501651 A1      7/1986
DE          4010982 A1     10/1990
(Continued)

*Primary Examiner* — Robert A Siconolfi
*Assistant Examiner* — San Aung
(74) *Attorney, Agent, or Firm* — Laurence A. Greenberg; Werner H. Stemer; Ralph E. Locher

(57) ABSTRACT

A suspension strut for a vehicle has an air spring unit and a damper unit. The damper unit has a damper tube, which extends into a rolling tube of the air spring unit. The damper tube has supporting geometries distributed over its circumference, against which supporting geometries a radially expanded end of the rolling tube is supported. In order to support the rolling tube on the supporting geometries of the damper tube, a torsion element is provided. The torsion element is arranged between the radially expanded end of the rolling tube and the supporting geometries of the damper tube. The torsion element forms a form fit with the supporting geometries for the purpose of torque transmission.

10 Claims, 3 Drawing Sheets

(51) Int. Cl.
*B60G 11/62* (2006.01)
*B60G 15/12* (2006.01)
*B60G 15/14* (2006.01)
*F16F 9/084* (2006.01)

(52) U.S. Cl.
CPC .............. *B60G 15/14* (2013.01); *F16F 9/084* (2013.01); *B60G 2202/14* (2013.01); *B60G 2202/314* (2013.01); *B60G 2204/1262* (2013.01); *B60G 2204/44* (2013.01); *B60G 2206/40* (2013.01)

(58) Field of Classification Search
CPC .... B60G 13/003; B60G 13/008; B60G 11/62; B60G 17/0416; B60G 2202/14; B60G 2202/312; B60G 2202/314; B60G 2204/418; B60G 2204/1262; B60G 2204/4232; B60G 3/01; F16F 9/05; F16F 9/38; F16F 9/084; F16F 9/364; F16F 13/06; F16F 13/08; F16F 13/18; F16F 13/106; F16F 13/107
USPC ............ 267/219, 64.21, 64.23, 64.27, 64.15; 188/322.13, 322.16
See application file for complete search history.

(56) References Cited

U.S. PATENT DOCUMENTS

| | | |
|---|---|---|
| 5,667,203 A | 9/1997 | Romer |
| 6,116,584 A * | 9/2000 | Romer ................ B60G 13/003 267/34 |
| 6,341,678 B1 | 1/2002 | Hoyte |
| 6,460,665 B1 | 10/2002 | Goetz |
| 6,814,346 B2 | 11/2004 | Mueller |
| 6,905,006 B2 * | 6/2005 | Handke ................ B60G 15/062 188/322.12 |
| 2004/0000748 A1 * | 1/2004 | Bell ....................... B60G 15/12 267/64.15 |
| 2005/0242542 A1 * | 11/2005 | Handke ................ B60G 15/063 280/124.155 |
| 2013/0270753 A1 * | 10/2013 | Balachonzew ....... F16F 9/0454 267/64.27 |

FOREIGN PATENT DOCUMENTS

| | | |
|---|---|---|
| DE | 19508980 C1 | 6/1996 |
| DE | 19908606 C1 | 6/2000 |
| DE | 10041927 A1 | 3/2001 |
| DE | 10207102 A1 | 10/2003 |

* cited by examiner

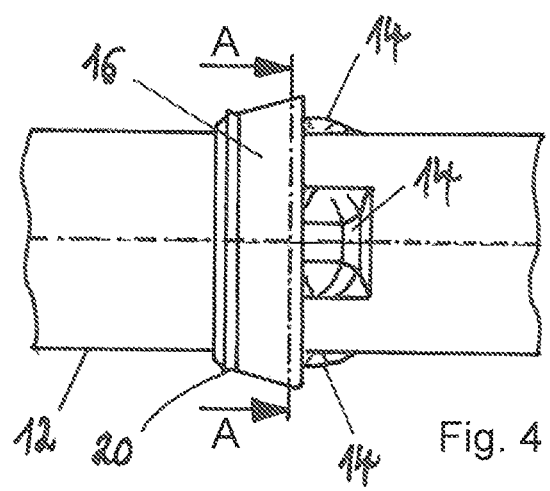
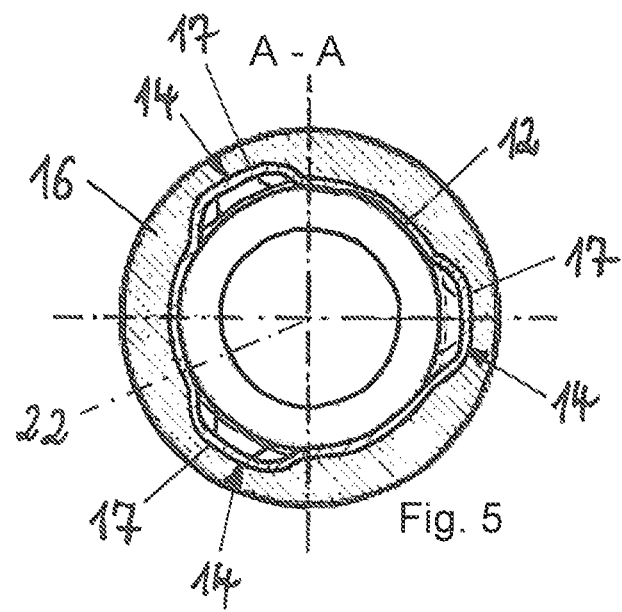

SUSPENSION STRUT FOR A VEHICLE

BACKGROUND OF THE INVENTION

Field of the Invention

The present invention relates to a suspension strut for a vehicle having an air spring unit and a damper unit, which damper unit has a damper tube, which extends into a rolling tube of the air spring unit, the damper tube having supporting geometries distributed over its circumference, against which supporting geometries a radially expanded end of the rolling tube is supported.

DE 102 07 102 B4 discloses a suspension strut for a vehicle having an air spring unit and a damper unit, and the damper unit has a damper tube, which extends into a rolling tube of the air spring unit. To support the rolling tube on the damper tube, the damper tube has supporting geometries, which are configured as stamped portions having a shoulder and against which the end of the rolling tube is supported.

The inner diameter of the rolling tube is configured with an only slightly greater diameter in the region of the support against the damper tube, so that the rolling tube produces an essentially rigid arrangement together with the damper tube.

A gas chamber is formed in the rolling tube for the function of the air spring unit, which chamber is pressurised so that the rolling tube has to be sealed off from the damper tube. In order to achieve the necessary sealing effect between the rolling tube and the damper tube, a groove is made in the damper tube, which groove is at a distance from the supporting geometries and into which an O-ring is places, which achieves a sealing effect against the inner side of the rolling tube, as a result of which however a complex overall arrangement is produced.

An essential disadvantage is that there is no resilience between the rolling tube and the damper tube, so that compensation of transverse forces, in particular of tilting of the damper tube in the rolling tube, is not possible and as a result of which the driving comfort of the vehicle running gear having a suspension strut of this type is negatively affected.

DE 195 08 980 C2 discloses a suspension strut for a vehicle according to a further embodiment, having an air spring unit and a damper unit, and a rolling tube of the air spring unit is held against a damper tube of the damper unit by means of an elastic ring part. The resilience of the ring part means that tilting of the rolling tube against the damper tube can be compensated; however, the damper tube does not have supporting geometries formed in segmented regions, and the ring part is supported against a collar-like flange, which is arranged on the outer circumference of the damper tube.

During use of a suspension strut of the present design, further loads can occur in addition to transverse forces and the tilting of the rolling tube against the damper tube caused thereby, and, to further improve the driving comfort, it is desirable for example to transmit torques occurring between the damper unit and the air spring unit. Although a suspension strut that has a rigid arrangement between the damper tube and the rolling tube can allow torque transmission between the damper tube and the rolling tube, the driving comfort is negatively affected by the rigid arrangement. If, however, a ring part consisting of an elastomer is used to compensate tilting of the rolling tube against the damper tube, it is disadvantageously not possible to transmit torques.

BRIEF SUMMARY OF THE INVENTION

It is the object of the present invention to create a suspension strut for a vehicle with which the above-described disadvantages of the prior art can be overcome; it is in particular the object to create a suspension strut that has increased driving comfort and allows improved support of the rolling tube on the damper tube.

This object is achieved proceeding from a suspension strut according to the independent claim. Advantageous developments of the invention are specified in the dependent claims.

The invention includes the technical teaching that, in order to support the rolling tube on the supporting geometries of the damper tube, a torsion element is provided, which torsion element is arranged between the radially expanded end of the rolling tube and the supporting geometries of the damper tube, the torsion element forming a form fit with the supporting geometries for the purpose of torque transmission.

The connection according to the invention between the rolling tube and the damper tube allows transmission of torques between the rolling tube and the damper tube owing to the torsion element, it being possible at the same time for any transverse forces and tilting moments of the rolling tube that occur with respect to the damper tube to be compensated likewise by the torsion element. The torsion element can be accommodated in the radially expanded end of the rolling tube and forms a form-fitting connection with the supporting geometries on the damper tube. The torque transmission is achieved in particular in the region of the smaller radius between the torsion element and the interior supporting geometries, so that no other connection has to be created to ensure the torque transmission thanks to the form-fitting connection between the torsion element and the damper tube.

During use of the suspension strut, a relative rotation can occur between the damper unit and the air spring unit about the longitudinal axis of the damper unit, and the torque transmission between the air spring unit and the damper unit in particular takes place in such a manner that it is accompanied by an elastic torsion in the torsion element. Small angular rotations of the rolling tube with respect to the damper tube and thus with respect to the damper unit can thus occur without a permanent change occurring in the angle position of the damper tube relative to the rolling tube about the longitudinal axis of the damper unit; in particular the torsion element provides an elastic resilience between the rolling tube and the damper tube about the longitudinal axis of the damper unit.

According to an advantageous embodiment, the torsion element can have interior recesses, in which the supporting geometries fit. The torsion element can be produced using a moulding or primary forming process, with which the interior recesses in the torsion element can be provided when it is produced. The number of interior recesses in the torsion element in this case preferably corresponds to the number of the supporting geometries formed in segmented regions on the damper tube. If the torsion element is arranged on the supporting geometries, in particular during mounting of the rolling tube on the damper tube, the supporting geometries can first be placed into the interior recesses in the torsion element, and the interior recesses can then be additionally adapted to the supporting geometries by a subsequent elastic deformation of the torsion element. For example, the interior recesses in the non-mounted state of the torsion element can be smaller than the supporting geometries, so that the form fit is formed by preformed interior recesses in the torsion element on the one hand and also by an elastic post-deformation of the recesses by the supporting geometries fitting inside.

Further advantageously, the torsion element can be configured in several parts and in particular be formed from a rubber-elastic material, and have a shape-stabilising body, which is preferably produced from a hard plastic material or a metal material, the core body preferably being overmoulded with the rubber-elastic material, in particular with a nitrile rubber or a natural rubber, using injection-moulding. The core body improves the shape stability of the torsion element during use of the suspension strut, in particular for transmission of torques occurring between the damper tube and the rolling tube. In addition, the fatigue strength of the torsion element over the service life of the suspension strut in the vehicle can be positively influenced by a shape-stabilising core body.

The suspension strut can be configured in such a manner that a pressure chamber is formed in the region between the damper tube and the rolling tube, in particular inside the rolling tube, the torsion element having a sealing lip running around the outside, which seals off the pressure chamber from the inside of the rolling tube. The sealing lip can be formed as a geometric moulding of the rubber-elastic material, in particular of the nitrile rubber or of the natural rubber, and thus be formed in one part with the torsion element. For example, the sealing lip can come to bear elastically against the inside of the rolling tube, so that a sealing effect is produced between the torsion element and the inside of the rolling tube. The torsion element can sit flush on the damper tube and in particular on the supporting geometries in such a manner that a sealing effect is already achieved just by the fitting of the torsion element on the damper tube or on the supporting geometries.

The supporting geometries can for example be formed as outwardly curved mouldings in the wall of the damper tube using a shaping method. For example, the mouldings can be formed by an elastic pressure buffer element in a transverse pressing process or by a method of internal high-pressure reshaping. It is also conceivable that the supporting geometries are attached as individual elements to the outside of the damper tube, for example by means of a soldering method, a welding method or another connection method.

A plurality of supporting geometries can preferably be provided on the circumference of the damper tube, which are preferably situated at one height in relation to the longitudinal axis of the damper unit, it also being possible for a single supporting geometry to be sufficient. The supporting geometries are preferably arranged in segmented regions on the outer circumference of the damper tube, and the damper tube has a continuous structure between the regions in which the supporting geometries are present, the rigidity and in particular the load capacity of the damper tube in the direction of the longitudinal axis is increased. If a plurality of supporting geometries is arranged on the circumference of the damper tube, they can preferably be uniformly distributed and thus at equal distances from each other. If, for example, three supporting geometries are arranged on the circumference of the damper tube, they have a distribution of 120° from each other. If a plurality of supporting geometries is provided distributed over the circumference of the damper tube, in particular the mechanical load of the individual supporting geometries is reduced.

It is also advantageous if the supporting geometries comprise a supporting shoulder, which faces in the direction of the air spring unit, the supporting geometries fitting with the supporting shoulders in the recesses of the torsion element. The supporting shoulders can form a force transmission face of the supporting geometries, which in each case can bear against a complementary force transmission face in the interior recesses in the torsion element.

The torsion element with its rubber-elastic material is advantageously vulcanised or adhesively bonded on the inside of the radially expanded end of the rolling tube or pressed into the radially expanded end. This produces a self-retaining arrangement of the torsion element on the rolling tube, as a result of which the handling of the rolling tube and of the torsion element during mounting of the suspension strut is improved. In particular, a correct fit of the torsion element in the radially expanded end of the rolling tube is ensured.

According to a further exemplary embodiment, the torsion element can be accommodated in the radially expanded end of the rolling tube in a form-fitting manner, it being possible for the radially expanded end to have an inwardly shaped edge, in particular an inwardly facing flared flange. A form fit between the torsion element and the rolling tube in the direction of the longitudinal axis can be formed by the edge or flared flange, so that the torsion element is accommodated at least in a captive manner, in particular even with compression in the radially expanded end of the rolling tube.

Further features that improve the invention are described in more detail below with the description of a preferred exemplary embodiment of the invention using the figures. In the figures:

BRIEF DESCRIPTION OF THE SEVERAL VIEWS OF THE DRAWING

FIG. 4 shows a side view of the arrangement of the torsion element on the damper tube, and FIG. 5 shows a cross-sectional view of the damper tube with a torsion element according to the section line A-A as shown in FIG. 4.

DESCRIPTION OF THE INVENTION

Figure 1:
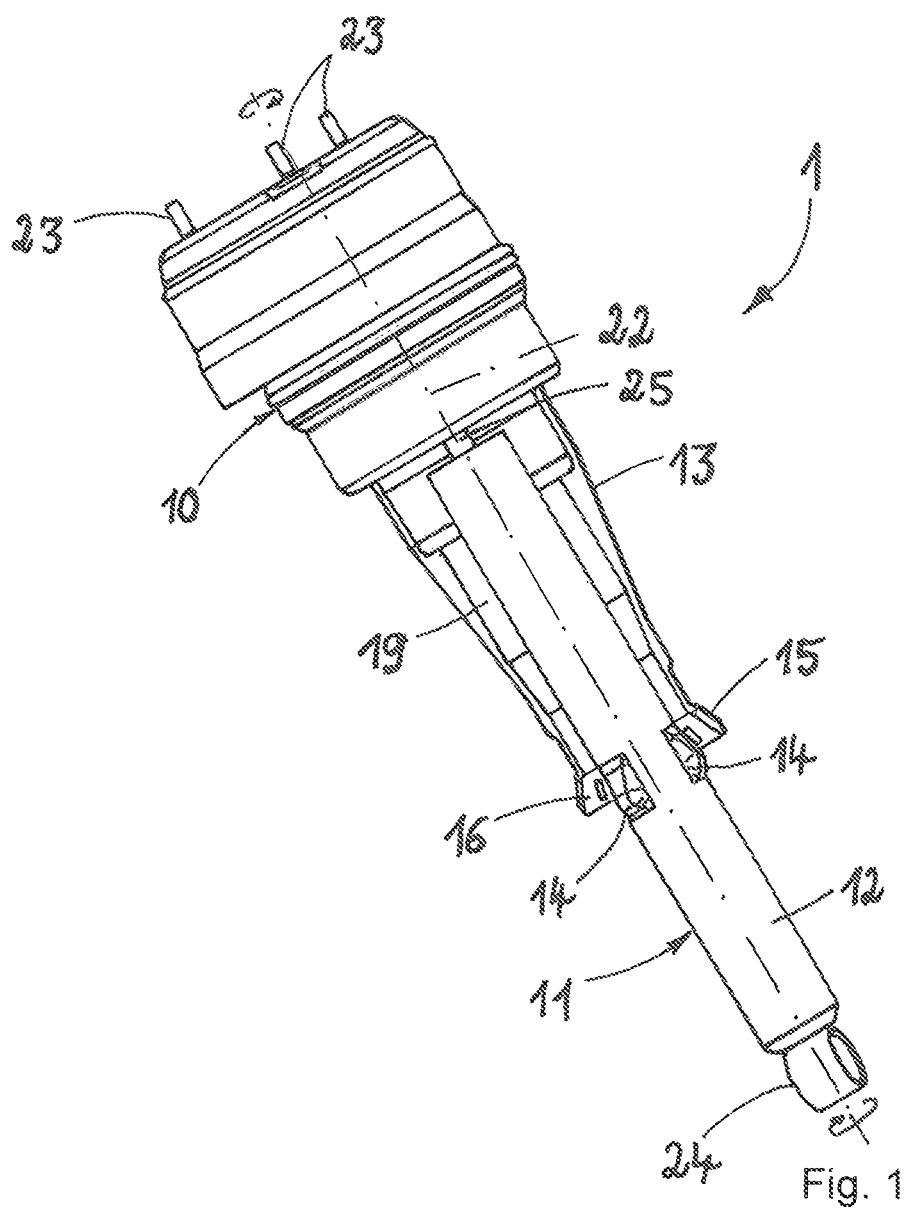
FIG. 1 shows an exemplary embodiment of a suspension strut in a cut away side view, with an arrangement according to the invention of the rolling tube of an air spring unit on the damper tube of a damper unit.

FIG. 1 shows an exemplary embodiment of a suspension strut 1 having the features of the present invention. The suspension strut 1 is used for arrangement in a vehicle running gear and forms a connecting member between a vehicle dome and an axle of the vehicle. The suspension strut 1 has an air spring unit 10 and a damper unit 11. The air spring unit 10 is used to suspend the axle on the vehicle frame, and the damper unit 11 provides damping of the movement of the axle on the vehicle. In order to arrange the suspension strut 1 in the vehicle, connecting bolts 23 are arranged at the end of the air spring unit 10, so that a direct connection is produced between a part of the air spring unit 10 and a spring dome of the vehicle. The damper unit 11 has a damper tube 12, and a fastening eye 24 is arranged at the end of the damper tube 12, with which fastening eye the damper unit 11 can be connected to the axle of the vehicle.

The damper tube 12 of the damper unit 11 extends into a rolling tube 13 of the air spring unit 10, and the damper unit 11 further has a piston rod 25, which extends into the air spring unit 10 and is connected to a part of the air spring unit 10 in a manner not shown in detail.

The rolling tube 13 is supported on supporting geometries 14, which are formed on the damper tube 12 of the damper unit 11. To this end, the rolling tube 13 has a radially expanded end 15, and a torsion element 16 is accommodated on the inside of the radially expanded end 15, by means of which torsion element the rolling tube 13 is supported on the supporting geometries 14.

The damper tube 12 extends along a longitudinal axis 22 of the suspension strut 1, and the exemplary embodiment shows three supporting geometries 14 on the circumference of the damper tube 12, which are situated at the same height in relation to the longitudinal axis 22. The torsion element 16 is arranged on the supporting geometries 14 in such a manner that the supporting geometries 14 fit inside the torsion element 16. A conical fit is produced by the radially expanding end 15 of the rolling tube 13, in which the torsion element fits in a force-transmitting manner. The arrangement of the torsion element 16 on the supporting geometries 14 of the damper tube 12 is shown in more detail in FIG. 2 below.

Figure 2:
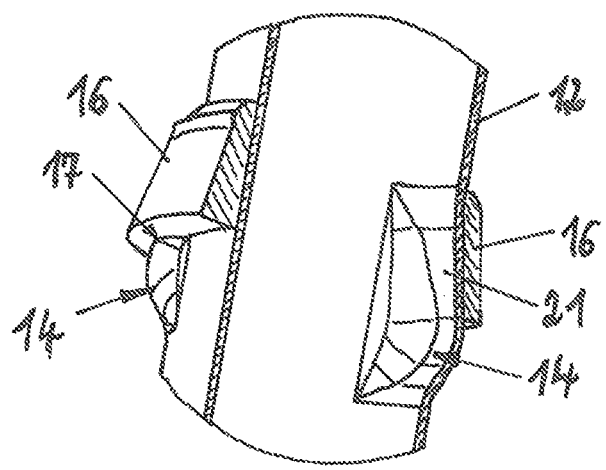
FIG. 2 shows an enlarged view of a detail of the arrangement of supporting geometries on a damper tube, on which a partially shown torsion element is shown.

FIG. 2 shows a view of a partially cut away damper tube 12, on which two supporting geometries 14 have been made by way of example. The supporting geometry 14 shown on the right is visible from the inside of the damper tube 12, and it can be seen that the supporting geometries 14 are formed as mouldings in the wall of the damper tube 12, which curve radially outwards from the inside of the damper tube 12. The supporting geometries 14 have a supporting shoulder 21, against which the torsion element 16 can bear. To this end, the torsion element 16 has recesses 17, in which the supporting geometries 14 can fit. The number of recesses 17 made on the inside of the torsion element 16 corresponds to the number of the supporting geometries 14 on the damper tube 12.

Figure 3:
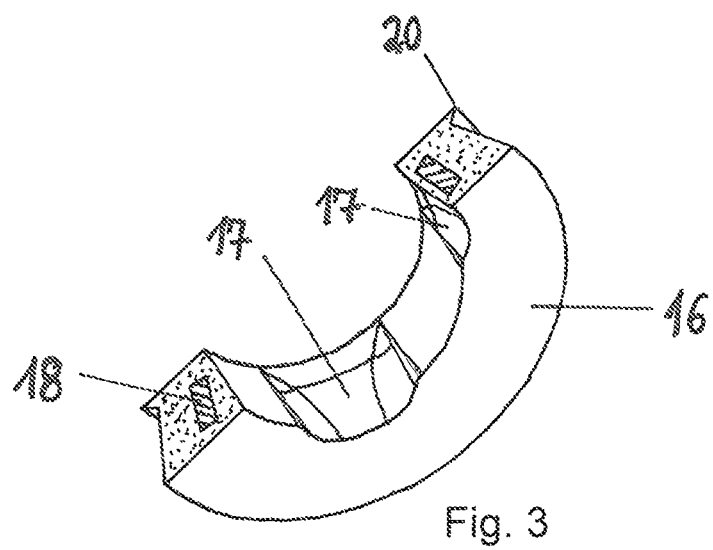
FIG. 3 shows a perspective view of a torsion element, shown cut away.

FIG. 3 shows a perspective view of an exemplary embodiment of a torsion element 16, as can be configured to form a connection according to the invention between the rolling tube 13 of the air spring unit 10 and the damper tube 12 of the damper unit 11. The torsion element 16 is essentially annular, the torsion element 16 being shown half cut away. On the inside the recesses 17 are shown, in which the supporting geometries 14 according to FIG. 2 can fit. The torsion element 16 in the form shown is in an uninstalled, unloaded state, and it can be seen that the recesses 17 are already made in the basic geometric structure of the torsion element 16.

The torsion element 16 has a rubber-elastic material, for example a nitrile rubber, which is produced by injection moulding. On the inside the torsion element 16 has a shape-stabilising core body 18, which is produced from a hard material, for example a hard plastic material or a metal material, and is formed running around with the torsion element 16 in an annular manner.

On the outside the torsion element 16 has an essentially conical contour, which is adapted to the conical shape of the radially expanded end 15 of the rolling tube 13. At the end of the torsion element 16, at which the conical outer contour has a smaller diameter, the torsion element 16 has a sealing lip 20, which is formed in one piece from the rubber-elastic material. With the sealing lip 20 the torsion element 16 can perform a sealing function against the inside of the rolling tube 13. The sealing effect between the torsion element 16 and the damper tube 12, in particular the supporting geometries 14, is achieved by the interior press fit of the torsion element 16. The radially expanded end 15 can either merely sit on the outside of the torsion element 16 or the torsion element 16 is vulcanised or for example adhesively bonded onto the inside of the radially expanded end 15 of the rolling tube 13.

FIG. 4 shows a side view of the arrangement of the torsion element 16 on the supporting geometries 14 of the damper tube 12, and the torsion element 16 has a sealing lip 20 on the outside. The cross-sectional view of the torsion element 16 on the supporting geometries 14 of the damper tube 12 according to section line A-A is shown in FIG. 5 below.

FIG. 5 shows a cross-sectional view of the arrangement of the torsion element 16 on the damper tube 12 according to section line A-A. The damper tube 12 is formed by way of example with three supporting geometries 14, which are formed as radially outwardly curved mouldings. To accommodate the supporting geometries 14 and thus to produce a form-fitting geometry, the torsion element 16 has recesses 17, in which the supporting geometries 14 fit. The form fit between the recesses 17 and the supporting geometries 14 allows the transmission of torques between the torsion element 16 and the damper tube 12 about the longitudinal axis 22, as a result of which a rotation of the damper unit 11 with respect to the air spring unit 10 is produced in the elastic region of the torsion element 16, as shown in FIG. 1. The elastic, torque-transmitting rotation of the damper unit 11 with respect to the air spring unit 10 can be an angle of less than 10°, preferably of less than 5°, and particularly preferably of less than 1° about the longitudinal axis 22.

According to a further embodiment, the radially expanded end 15 of the rolling tube 13 can have a corrugated shape, which is formed in a complementary manner to the supporting geometries 14 in the damper tube 12. For example, the radially expanded end 15 can have three wave-like, outwardly formed bulges, which are made in the radially expanded end 15 in the radial positions in which the supporting geometries 14 are also situated. The torsion element 16, when in the mounted state, can press elastically into the outwardly formed bulges in the end 15, as a result of which a form fit between the torsion element 16 and the rolling tube 13 is likewise created in the direction of rotation.

The invention is not limited in its implementation to the above-specified preferred exemplary embodiment. Rather, a number of variants are conceivable, which make use of the solution described even with fundamentally differently designed configurations. All the features and/or advantages given in the claims, description or drawings, including design details or spatial arrangements, can be essential to the invention both alone and in a wide variety of combinations.

LIST OF REFERENCE SYMBOLS

1 Suspension strut
10 Air spring unit
11 Damper unit
12 Damper tube
13 Rolling tube
14 Supporting geometry
15 Radially expanded end
16 Torsion element
17 Recess
18 Core body
19 Pressure chamber
20 Sealing lip
21 Supporting shoulder
22 Longitudinal axis
23 Connecting bolts
24 Fastening eye
25 Piston rod

The invention claimed is:

1. A suspension strut for a vehicle, the suspension strut comprising:
an air spring unit having a rolling tube with a radially expanded end;
a damper unit having a damper tube extending into said rolling tube of said air spring unit, said damper tube having a circumference and distally separated supporting geometries distributed over said circumference, against said supporting geometries said radially expanded end of said rolling tube is supported; and
a torsion element for supporting said rolling tube on said supporting geometries of said damper tube, said torsion element disposed between said radially expanded end of said rolling tube and said supporting geometries of said damper tube, said torsion element forming a form fit with said supporting geometries for purposes of torque transmission, said torsion element having interior recesses formed therein and said supporting geometries being disposed in said interior recesses in a formed fitted manner, said torsion element being one of vulcanized on or adhesively bonded to an inner side of said radially expanded end of said rolling tube; and
during use of the suspension strut, a relative rotation is produced between said damper unit and said air spring unit about a longitudinal axis of said damper unit, wherein the torque transmission between said air spring unit and said damper unit takes place by an elastic torsion of said torsion element.

2. The suspension strut according to claim 1, wherein said torsion element is configured in several parts and has a shape-stabilizing core body, said shape-stabilizing core body being over molded with a rubber-elastic material via injection-molding.

3. The suspension strut according to claim 1, wherein:
said damper tube and said rolling tube defining a pressure chamber formed in a region between said damper tube and said rolling tube; and
said torsion element has a sealing lip running around an outside, and seals off said pressure chamber from an inside of said rolling tube.

4. The suspension strut according to claim 1, wherein said damper tube has a wall and said supporting geometries are formed as outwardly curved moldings in said wall of said damper tube using a shaping method.

5. The suspension strut according to claim 1, wherein three said supporting geometries are distributed 120° apart over said circumference of said damper tube.

6. The suspension strut according to claim 1, wherein said supporting geometries have a supporting shoulder facing in a direction of said air spring unit, wherein said supporting geometries fit in said supporting shoulder in said interior recesses in said torsion element.

7. The suspension strut according to claim 1, wherein said torsion element is vulcanized or adhesively bonded on an inside of said radially expanded end of said rolling tube or is pressed into said radially expanded end.

8. The suspension strut according to claim 1, wherein said torsion element is accommodated in a form-fitting manner in said radially expanded end of said rolling tube, said radially expanded end has an inwardly shaped edge, by means of said inwardly shaped edge a form fit is formed between said torsion element and said rolling tube in a direction of a longitudinal axis of said damper unit.

9. The suspension strut according to claim 2, wherein:
said torsion element is formed from a rubber-elastic material;
said shape-stabilizing core body is formed from a hard plastic material or a metal material; and
said rubber-elastic material is a nitrile rubber.

10. The suspension strut according to claim 8, wherein said inwardly shaped edge is an inwardly facing flared flange.

* * * * *